United States Patent [19]

Sandin

[11] 3,997,723
[45] Dec. 14, 1976

[54] COMPACT UNIT FOR OPTICAL SECURITY SYSTEM

[75] Inventor: Walter T. Sandin, Old Tappan, N.J.

[73] Assignee: Visual Methods, Inc., Montvale, N.J.

[22] Filed: Aug. 19, 1974

[21] Appl. No.: 498,405

[52] U.S. Cl. ............................... 178/7.8; 178/7.9;
 178/7.91; 178/7.92; 178/DIG. 1; 178/DIG. 38
[51] Int. Cl.² ........................................ H04N 7/18
[58] Field of Search ............... 178/7.91, 7.92, 7.8,
 178/DIG. 1, DIG. 38; 235/61.7 B; 340/149 A

[56] References Cited
UNITED STATES PATENTS

| | | | |
|---|---|---|---|
| 3,564,132 | 2/1971 | Baker | 178/6.8 |
| 3,612,764 | 10/1971 | Gilkerson | 178/7.88 |
| 3,631,773 | 1/1972 | Moodie | 95/1.1 |

*Primary Examiner*—Benedict V. Safourek
*Assistant Examiner*—Edward L. Coles

[57] ABSTRACT

A thin wall-mountable unit is disclosed which produces a composite image from a card-like object placed in a slot and a person standing adjacent thereto. The unit includes a pair of lenses for focusing images of the objects on intersecting focal planes. A mirror is mounted in the unit at the intersection of the focal planes. A T.V. camera is employed to sense the composite image resulting therefrom.

13 Claims, 5 Drawing Figures

3,997,723

COMPACT UNIT FOR OPTICAL SECURITY SYSTEM

FIELD OF THE INVENTION

This invention relates to systems for producing composite images and particularly to systems for producing composite images by optical means.

BACKGROUND OF THE INVENTION

Security systems have been proposed for remote control of entry of persons to a secured area. Such systems are desirable where a secured area has more than one point of entry and large traffic is not contemplated.

Examples of proposed systems can be seen in U.S. Pat. Nos. 3,564,132 and 3,612,764.

In each of these systems, an image of the person desirous of entering the facility and an identification card having a picture of that person, are presented to a security guard on a monitor at a remote location.

In U.S. Pat. No. 3,564,132, two T.V. sensors are employed as well as two display devices. Systems such as this are expensive and therefore are not economically justifiable for many applications or aesthetically acceptable.

In U.S. Pat. No. 3,612,764, optical apparatus is disclosed for combining images of the two objects (the person and the card) on a single T.V. sensor for projection on a single T.V. monitor. This system results in the use of a large amount of space for the mounting of the optical equipment and positioning of the person and the card to be viewed. Further, this system requires additional apparatus to indicate to the user thereof where to position the card and himself to be properly viewed.

U.S. Pat. No. 2,914,746 discloses an additional system for placing the picture of a live subject and a photo on a card onto a single visual monitor. This system is also bulky and requires substantial space for implementation.

U.S. Pat. No. 2,821,105 shows another way of combining two images on a single T.V. sensor. The apparatus shown in this patent also is bulky and would not be suitable for an inexpensive compact unit.

Therefore it is an object of this invention to provide a new and useful system for providing a composite image which results in a compact unit for use in a security system.

BRIEF DESCRIPTION OF THE INVENTION

With this and other objects in view, the present invention contemplates a composite image producing system including a housing, a first lens mounted in the housing and having an optical axis for forming the image of a first object in a first focal point. The first object is located at a first predetermined position which is to a first side of the optical axis. A second lens is also included mounted in the housing for forming the image of a second object in a second focal plane which includes the optical axis of the first lens. The second object is located at a second predetermined position. The second focal plane intersects the first focal plane at a line of intersection. A first mirror is mounted in the housing with an edge thereof at the line of intersection. The mirror is located to a second side of the optical axis.

In the preferred embodiment of the invention a T.V. camera is employed to sense the composite image produced by the above-described system. As a result of the interconnection of structure as described above, the T.V. camera can be mounted in the housing to provide a flat compact wall-mountable unit which requires a minimum of space to produce the composite image.

The preferred embodiment also includes indications on the housing for defining the first predetermined position in front thereof. The indications can be a second mirror mounted to the first side of the optical axis.

A third mirror is also provided for reflecting light from the second position onto the second lens. Thus, a compact easily usable unit is provided.

If the composite image produced by the above system is to be recorded and employed as a punch-clock device, a digital clock may be mounted in a portion of the second predetermined position so that an indication of time can be included in the composite image.

DESCRIPTION OF THE DRAWING

For a more complete understanding of the invention, reference should be made to the following detailed description of the invention and drawings in which.

DETAILED DESCRIPTION OF THE INVENTION

Figure 1:
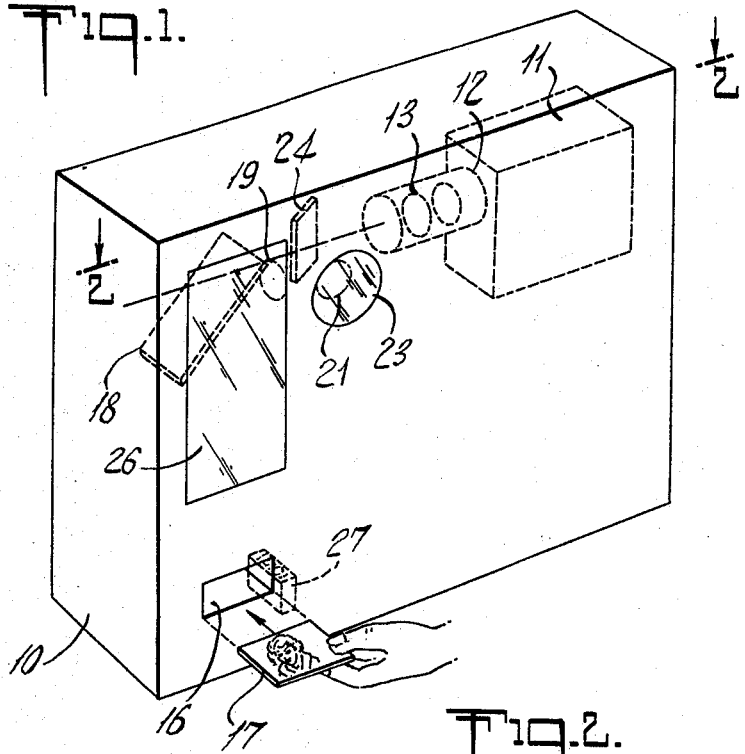
FIG. 1 is a perspective view of a composite image producing system constructed in accordance with the teachings of this invention.

Referring now to all the Figures, we see a housing 10 which interrelates the elements of this invention. The housing 10 is approximately 5 inches thick and can be wall-mounted, taking up a minimal amount of space. As shall be discussed below, such units can be placed by entry ways for security checking at a remote location. Further, a mirror can be mounted on a wall opposite the unit for providing security for the entire area.

A T.V. camera 11 is mounted in the housing. The T.V. camera 11 has a vidicon (not shown) therein whose active surface is located at a position 12. A short focal length (25 mm) relay lens set 13 having a back focal length of appproximately 0.63 inches is included to relay and focus images from the intermediate focal plane area 14 onto the vidicon surface at position 12.

The housing 10 also includes a slot 16 for receiving a card 17. The card 17 is shown in FIG. 1 being inserted into the slot 16 while in FIGS. 2 and 3, it is shown already inserted therein. As more clearly seen in FIG. 1, the card 17 has a picture (and can have name, and signature, employee number etc.) thereon of the person to whom access to the secured area may be given. It is, of course, understood that any of the normal type of identification cards can be used in which only a portion thereof includes the picture of the person. This picture may be located at any portion of the card and in various orientations such as horizontal or vertical. Of course it is understood that the configuration of the slot 16 and the associated optics should be adjusted to compensate therefor.

A mirror 18 is adjustably mounted in the housing 10 above the slot 16. The mirror 18 is adjustably mounted so that it can take the image from the card 17 and direct it onto a lens 19 mounted in the housing 10. The lens 19 focuses an image of an object in the slot 16 onto the plane 14 which can best be seen in FIG. 4. The lens 19 is in the preferred embodiment a 25 millimeter focal length lens having a field of view of 30°.

A wide angle lens 21 having a focal length of 8.5 millimeters and a field of view of 90° is mounted with its optical axis in the plane 14. The lens 21 focuses images of objects in front of the housing 10 onto a plane 22 (see best in FIGS. 2 and 4).

A window 23 is provided in the front of the housing 10, sufficiently large so as not to obstruct the field of view of the lens 21.

At the intersection of the planes 14 and 22 (b c in FIG. 4) one edge of a mirror 24 is mounted. In the preferred embodiment, the planes 14 and 22 are at right angles to each other and the angle of the mirror 24 is 45 degrees with respect to each plane. Mirror 24 has its edge b c located at the intersection of planes 14 and 22. This sharp edge produces the correspondingly sharp image splitting on the vidicon and monitor screen.

Figure 2:
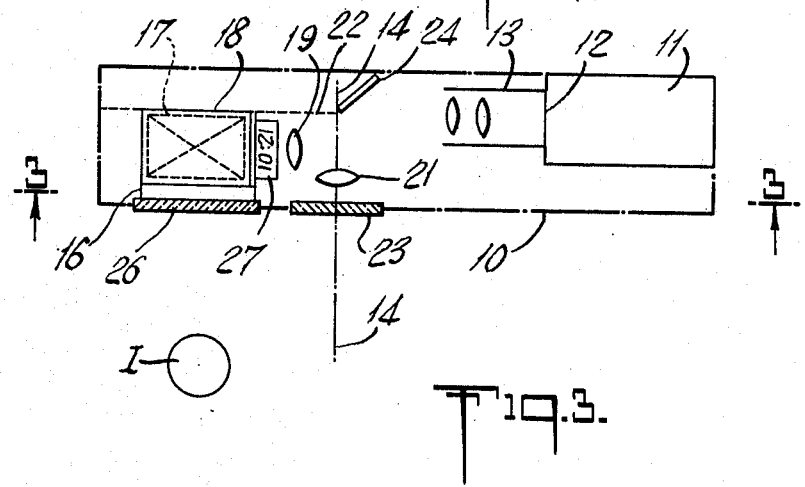
FIG. 2 is a sectional view taken along lines 2—2 of FIG. 1.
Figure 3:
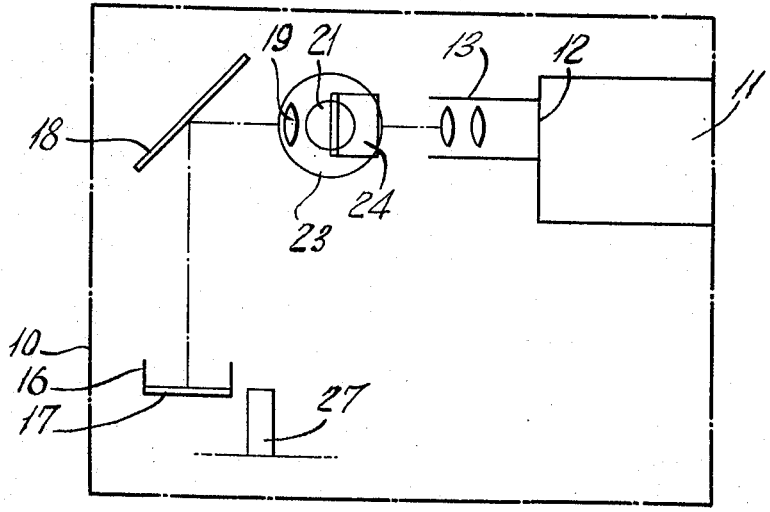
FIG. 3 is a sectional view taken along the lines 3—3 of FIG. 2.
Figure 4:
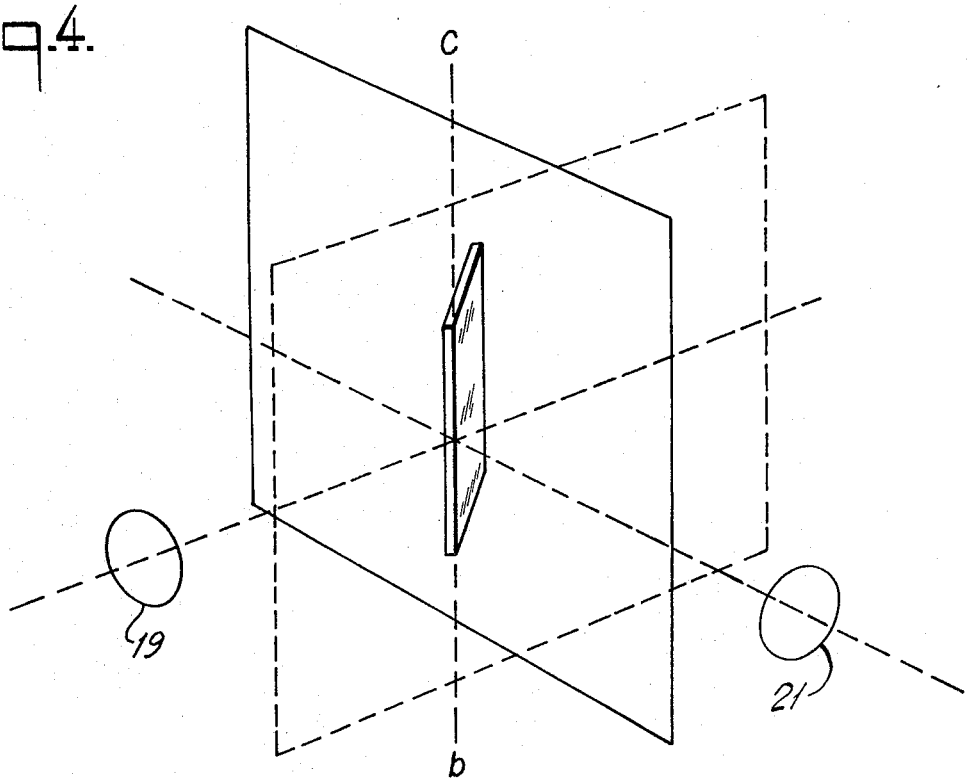
FIG. 4 is a perspective schematic view showing some of the optical elements of the system shown in FIG. 1.

In operation, the image of the card, etc. in the slot 16 is focused onto the plane 14 by the lens 19 after being reflected by the mirror 18. Since the mirror 24 would block images on the plane 14 in the plane 22 in region a b c d, the desired image is focused on that portion of the plane 14 b e f c adjacent to the edge of the mirror 24 as seen in FIGS. 2 and 4.

Figure 5:
FIG. 5 is a view of a composite image as found by the system of the invention.

Since the lens 21 is mounted with its optical axis on the plane 14, light passing through the left side thereof will be focused on the plane 22 to the right-hand side of the plane 14, while light passing through the right-hand side of the lens 21 will be focused on the left-hand side of the plane 22. Since the mirror 24 is to the right-hand side of the plane 14, only images to the left of the plane 14 in front of the housing 10 will be operated upon by the mirror 24. Therefore, the person 1 should stand to the left of the plane 14 centered in the field of view of the left-hand portion of the lens 21 as shown in FIG. 2. To aid in the positioning of the person, a mirror 26 is affixed to the front of the housing 10. A person 1 to be viewed stands in front of the mirror 26. The mirror 26 is centered in the field of view of the left-hand portion of the lens 21. In this way when a person sees himself in the mirror 26, he is properly positioned. Further, as seen in FIG. 1 and 2, he is also properly positioned for conveniently inserting the card 17 into the slot 16. Light from the person 1 passes through the window 23 onto the lens 21 and is then focused on the plane 22 to the right-hand side of the plane 14 (see FIG. 4). Light passing through the right-hand side of the lens 21 is focused on the plane 22 to the left-hand side of the plane 14 but, as will be seen, does not result in the composite image form. The image on the plane 22 to the right of the plane 14 provides a virtual image to the T.V. camera 11 appearing in the plane 14 above the plane 22. Therefore it is seen that an image is formed by the lens 19 on the plane 14 in front of the plane 22 (see FIG. 4) from the object on the card 17 while an image is formed by the lens 21 on the plane 22 and reflected by mirror 24 of the person 1 standing in from of the mirror 26. These two adjacent images are sensed by the T.V. camera 11 and provided on a remote monitor (FIG. 5). A security guard at the monitor can compare the two images and decide whether access should be given to person to the secured area.

If there is any writing on the card 17 which must be read by the guard at the remote monitor, the horizontal deflection coils of the T.V. camera 11 should be reversed to compensate for the inverting effect of the lens system.

In the preferred embodiment of this invention, a digital clock 27 is mounted in the housing 10 and occupies a portion of the slot 16 which the mirror 18 and lens 19 operate upon. In this way, the time that a person wishes access to the security area can also be included in the composite image. A T.V. tape recorder can be employed to produce a permanent record of access times.

It should, of course, be understood that photographic cameras or other type of light sensing equipment can be employed instead of the T.V. camera 11.

As was indicated above, a mirror can be mounted behind the person 11 on a back wall so that the security guard at the monitor can determine if others are in the room and wishing to obtain access to the area.

It should, of course, be understood that while this invention has been described with respect to a particular embodiment thereof, numerous others will become obvious to those of ordinary skill in the art in light thereof.

What is claimed is:

1. A composite image producing system including:
   a housing;
   a first lens, mounted in said housing and having an optical axis, for forming the image of a first object in a first focal plane; said first object being located at a first predetermined position to a first side of said optical axis;
   a second lens, mounted in said housing, for forming the image of a second object in a second focal plane which includes said optical axis; said second object being located at a second predetermined position; said second focal plane intersecting said first focal plane at a line of intersection; and
   a first mirror; said first mirror having an edge; said first mirror being mounted in said housing with said edge at said line of intersection and to a second side of said optical axis.

2. The composite image producing system as defined in claim 1 also including:
   means, mounted on said housng, for defining said first predetermined position in front of said housing.

3. The composite image producing system as defined in claim 2 in which said means for defining said first predetermined position is a second mirror.

4. The composite image providing system as defined in claim 3 in which said second predetermined position is located within said housing.

5. The composite image providing system as defined in claim 4 also including:
   a third mirror for reflecting light from said second predetermined position onto said second lens.

6. The composite image providing system as defined in claim 5 also including:
   means, mounted at said second predetermined position, for indicating time.

7. The composite image producing system as defined in claim 1 also including:
   means mounted in said housing, for sensing said composite image.

8. The composite image producing system as defined in clam 7 in which said sensing means is a T.V. camera.

9. The composite image producing system as defined in claim 8 also including:
   means, mounted on said housing, for defining said first predetermined position in front of said housing.

10. The composite image producing system as defined in claim 9 in which said means for defining said first predetermined position is a second mirror.

11. The composite image providing system as defined in claim 10 in which said second predetermined position is located within said housing.

12. The composite image providing system as defined in claim 11 also including:
   a third mirror for reflecting light from said secnd predetermined position onto said second lens.

13. The composite image providing system as defined in claim 12 also including:
   means, mounted at said second predetermined position, for indicating time.

* * * * *